United States Patent [19]

Gupta

[11] Patent Number: 4,877,843

[45] Date of Patent: * Oct. 31, 1989

[54] SELECTIVE HYDROLYSIS OF COPOLYMERS OF PARA-ACETOXY STYRENE AND ALLYL ESTERS OF ETHYLENICALLY UNSATURATED ACIDS

[75] Inventor: Balaram Gupta, North Plainfield, N.J.

[73] Assignee: Hoechst Celanese Corporation, Somerville, N.J.

[*] Notice: The portion of the term of this patent subsequent to Aug. 25, 2004 has been disclaimed.

[21] Appl. No.: 99,430

[22] Filed: Sep. 11, 1987

[51] Int. Cl.$^4$ .................................................. C08F 8/12
[52] U.S. Cl. .................................. 525/344; 525/328.9; 525/353; 525/355; 525/366; 525/369; 525/378
[58] Field of Search ............... 525/344, 378, 353, 355, 525/366, 369

[56] References Cited

U.S. PATENT DOCUMENTS 4,689,371 8/1987 Elmore et al. .................... 525/329.5

Primary Examiner—Joseph L. Schofer
Assistant Examiner—Bernard Lipman
Attorney, Agent, or Firm—Lynch, Cox, Gilman & Mahan

[57] ABSTRACT

Copolymers of p-acetoxystyrene and allyl esters of ethylenically unsaturated acids are selectively hydrolyzed to copolymers of p-vinylphenol and allyl esters of ethylenically unsaturated acids using acid or base catalysis in an alcohol or water.

17 Claims, No Drawings

SELECTIVE HYDROLYSIS OF COPOLYMERS OF PARA-ACETOXY STYRENE AND ALLYL ESTERS OF ETHYLENICALLY UNSATURATED ACIDS

BACKGROUND OF THE INVENTION

The field of art to which this invention pertains is copolymers of vinylphenol.

Homopolymers and copolymers of 4-hydroxystyrene, or p-vinylphenol as it is also called, are known compositions which have many uses, such as in the manufacture of metal treatment compositions and photoresists. Polymers of p-vinylphenol can be made by polymerizing p-vinylphenol itself. However, p-vinylphenol is an unstable compound and must be refrigerated to prevent it from polymerizing spontaneously. Even under refrigeration, the monomer will slowly polymerize to low molecular weight polymers. 4-Acetoxystyrene, the acetic acid ester of p-vinylphenol, is a stable monomer which can be readily homopolymerized and copolymerized to low, medium and high molecular weight polymers. After polymerization, the phenolic ester group can be hydrolyzed to produce p-vinylphenol polymers.

Corson et. al., Journal of Organic Chemistry, 23, 544–549 (1958), describe a 5 step process for making p-vinylphenol from phenol. The phenol is first acetylated to p-hydroxyacetophenone which is then acetylated to p-acetoxyacetophenone. This compound is hydrogenated to p-acetoxyphenylmethyl carbinol which is then dehydrated to p-acetoxystyrene. The p-acetoxystyrene is saponified to p-vinylphenol using potassium hydroxide. Packham, in the Journal of the Chemical Society, 1964, 2617–2624, describes the hydrolysis of crosslinked poly-4-hydroxystyrene by refluxing the polymer in alkaline aqueous dioxane for 2 days. In U.S. Pat. No. 4,544,704, a copolymer of styrene and p-isopropenylphenylacetate is hydrolyzed with aqueous sodium hydroxide in methanol and toluene using a small amount of benzyltrimethylammonium chloride as a phase transfer agent. Arshady et. al., Journal of Polymer Science, 12, 2017–2025 (1974), hydrolyzed copolymers of styrene and acetoxystyrene to the vinylphenol polymer using hydrazine hydrate in dioxane.

The ester interchange reaction of poly (4-acetoxystyrene) in methanol using sodium methylate is described in U.S. Pat. No. 2,276,138. It is also stated in the patent that resinous polymers are obtained by the treatment of monomeric 4-acetoxystyrene with potassium hydroxide in methanol both cold and hot and with methanol using sulfuric acid as the ester interchange catalyst.

In copending patent application Ser. No. 22,186, filed March 5, 1987, homopolymers and copolymers of p-acetoxystyrene are hydrolyzed to homopolymers and copolymers of p-vinylphenol by acid catalyzed transesterification in alcohols.

In copending patent application, Ser. No. 29108, filed Mar. 23, 1987 now U.S. Pat. No. 4,775,730, copolymers of p-acetoxystyrene and other monomers are described.

SUMMARY OF THE INVENTION

This invention pertains to a process for selectively hydrolyzing copolymers of p-acetoxystyrene and allyl ester of unsaturated acids to copolymers of p-vinylphenol and allyl esters of unsaturated acids. In one aspect, the invention relates to an acid catalyzed selective hydrolysis process. In another aspect, the invention pertains to a base catalyzed selective hydrolysis process.

By the process of this invention, copolymers of p-acetoxystyrene and allyl esters of ethylenically unsaturated acids are slurried in an alcohol or water and are hydrolyzed to copolymers of p-vinylphenol and allyl esters of ethylenically unsaturated acids at a temperature of about 20° C. to about 100° C. in the presence of an acid or a base for a time sufficient to hydrolyze the acetoxy groups to phenolic groups as indicated by dissolution of the copolymer in the alcohol or water. The resulting copolymers can be used as vinylphenol copolymers without interfering reactions with carboxylic acid groups since the allyl ester groups are not hydrolyzed. Also, the allyl groups which remain in the copolymers can be used in subsequent reactions, e.g., radiation curing.

DESCRIPTION OF THE INVENTION

The p-acetoxystyrene component of the copolymers used in this invention can be made by the process described in Corson et. al., Journal of Organic Chemistry 23, 544–549 (1958). As described in this article, phenol is acetylated to p-hydroxyacetophenone which is then acetylated to p-acetoxyacetophenone. This compound is then hydrogenated to p-acetoxyphenylmethylcarbinol, which is then dehydrated to p-acetoxystyrene.

The allyl ester monomers useful in this invention are mono and diallyl esters of, respectively, mono and dicarboxylic acids which acids contain one polymerizable ethylenically unsaturated group. Examples of such esters include allyl acrylate, allyl methacrylate, allyl ethacrylate, diallyl maleate, diallyl fumarate, diallyl itaconate, allyl sorbate and diallyl muconate. These allyl ester monomers can be polymerized through the ethylene unsaturation leaving the allyl unsaturation intact.

The copolymers reacted in this invention can be prepared by the free radical polymerization of p-acetoxystyrene and the allyl monomers in solution, emulsion, or suspension using well known polymerization techniques. The copolymers contain about 10 to about 90 weight percent p-acetoxystyrene and about 10 to about 90 weight percent of the allyl ester monomer. Preferred copolymers are those made from diallyl maleate and p-acetoxystyrene using about 30 to about 70 weight percent diallyl maleate and about 30 to about 70 weight percent p-acetoxystyrene.

In carrying out the process of this invention, the 4-acetoxystyrene-allyl ester copolymer is slurried in alcohol or aqueous base in the amount of about 5 percent by weight of polymer up to about 40 percent by weight of polymer in the alcohol or aqueous base wherein the percentages are based on the total weight of polymer and alcohol or aqueous base. The slurry is stirred and the catalyst is added. Heating at about 20° C. to about 100° C. is continued until the polymer dissolves in the alcohol or aqueous base indicating complete conversion of the acetoxy groups to phenolic groups. Generally, this heating period will vary from about 1 hour to about 20 hours. When solution is obtained indicating the completion of the hydrolysis of acetoxy groups to phenolic groups, the copolymer is recovered by means well known to those skilled in the art. If the hydrolysis reaction is conducted in aqueous base, the polymer can be recovered from solution by precipitation with acid. If the reaction is an alcoholysis reaction in alcohol, the polymer can be recovered by precipitating and coagulating the polymer in water.

Alcohols useful in this invention are the one to four carbon alcohols, i.e., methanol, ethanol, the propanols and the butanols. The preferred alcohols are methanol and ethanol with methanol being most preferred.

Acids useful in this invention are mineral acids and organic acids which have dissociation constants in aqueous solutions, i.e., $pK_a$, of less than 2 and, preferably, less than 1. Examples of such acids include hydrochloric acid, sulfuric acid, phosphoric acid, methanesulfonic acid, p-toluene sulfonic acid, benzyl sulfonic acid, dichloroacetic acid, trichloroacetic acid, iodic acid, boron trifluoride, aluminum chloride, stannic chloride and the like. The amounts of acid used in the process of this invention are catalytic amounts, i.e., about 1 percent by weight based on the weight of 4-acetoxystyrene polymer up to about 40 percent by weight.

Bases used in this invention are the alkali metal hydroxides and alkoxides, preferably sodium methoxide, ammonium hydroxide and quaternary ammonium hydroxides, such as tetramethylammonium hydroxide, ethyltrimethylammonium hydroxide, diethyldimethylammonium hydroxide, triethylmethylammonium hydroxide, tetraethylammonium hydroxide, benzyltrimethylammonium hydroxide and choline. The bases are used in amounts which are at least about equivalent to acetoxy groups in the copolymer. Large excesses of base can also be used.

Surprisingly the acid or base hydrolysis of the acetoxy groups in copolymers of p-acetoxystyrene and allyl ester monomers can be conducted with little or no saponification of the allyl ester groups. The absence of carboxylic acids groups in the copolymer enables reactions to be conducted with the phenolic groups with no interference. For example, esterification reactions with added acids, e.g., acrylic acid, and the phenolic groups can be conducted without crosslinking which could occur if carboxylic acid groups were present in the copolymer. Furthermore, the unhydrolyzed allyl groups can be used for subsequent reactions.

The hydrolyzed copolymers of this invention can be used to make phosphated coatings for metal treatment and in radiation curable coatings compositions. The copolymers are also useful as positive acting photoresist materials, as deep ultra-violet resist materials and in image reversal type positive resist formulations. Additional uses are polymer modifiers and polymer compatibilizers.

The following examples describe the invention in more detail. Parts and percentages unless otherwise indicated are parts and percentages by weight.

EXAMPLE 1

To a suitable reactor are added 5 parts of a 90:10 molar copolymer of p-acetoxystyrene and diallyl maleate, 0.5 part by volume of methane sulfonic acid and 50 parts by volume of methanol. Argon gas purge is applied and the slurry is stirred at room temperature until the slurried polymer dissolves, a period of 2 hours and 50 minutes. The solution is filtered and is coagulated with 400 parts of water. After filtering, the coagulated polymer is dried under vacuum at 40 to 50° C. Analysis shows the polymer to be a copolymer of vinylphenol and diallyl maleate.

EXAMPLE 2

To a suitable reactor are added 50 parts of a 80:20 molar copolymer of p-acetoxystyrene and diallyl maleate, 5 parts by volume of methane-sulfonic acid and 500 parts by volume of methanol. Argon gas purge is applied and the slurry is stirred at 30° C. for 3 hours. The resulting substantially clear solution is filtered and is coagulated with 4000 parts of water. After filtering, the coagulated polymer is dried under vacuum at 40 to 50° C. Analysis shows the polymer to be a copolymer of p-vinylphenol and diallyl maleate.

EXAMPLE 3

To a suitable reactor are added 5 parts of a copolymer of p-acetoxystyrene and diallyl maleate in a weight ratio of 65:35 and 100 parts by volume of 20 percent aqueous tetramethyl ammonium hydroxide. The resulting slurry is heated at reflux temperature for one hour, at which time the polymer is dissolved. The solution is acidified to a pH of 3 with concentrated hydrochloric acid and a white granular polymer is precipitated. After filtering and drying, analysis shows the polymer to be a copolymer of p-vinylphenol and diallyl maleate.

EXAMPLE 4

To a suitable reactor are added 5 parts of a copolymer of p-acetoxystyrene and allyl methacrylate in a weight ratio of 90:10, 0.5 part by volume of methanesulfonic acid and 50 parts by volume of methanol. Argon gas purge is applied and the slurry is stirred at room temperature for 3 hours. At the end of this period, the resulting substantially clear solution is filtered and is coagulated with 400 parts of water. The coagulated polymer is recovered by filtering and is dried under vacuum at 40° to 50° C. Analysis shows the polymer to be a copolymer of p-vinylphenol and allyl methacrylate.

The principles, preferred embodiments and modes of operation of the present invention have been described in the foregoing specification. The invention which is intended to be protected herein, however, is not to be construed as limited to the particular forms disclosed, since these are to be regarded as illustrating rather than restrictive. Variations and changes may be made by those skilled in the art without departing from the spirit of the invention.

What is claimed:

1. A process for preparing copolymers of p-vinylphenol and allyl esters of ethylenically unsaturated acids which comprises slurrying copolymers of p-acetoxystyrene and allyl esters of ethylenically, unsaturated acids in water or an alcohol followed by hydrolyzing the acetoxy groups with an acid or a base with substantially no saponification of the allyl ester groups.

2. The process of claim 1 wherein the hydrolysis reaction is conducted at a temperature of about 20° C. to about 100° C.

3. The process of claim 1 wherein the copolymer contains about 10 to about 90 weight percent p-acetoxystyrene and about 90 to about 10 weight percent allyl ester of an ethylenically unsaturated acid.

4. The process of claim 1 wherein the allyl ester is a diallyl ester of an ethylenically unsaturated dicarboxylic acid.

5. The process of claim 4 wherein the ester is diallyl maleate.

6. The process of claim 1 wherein the allyl ester is a monoallyl ester of an ethylenically unsaturated monocarboxylic acid.

7. The process of claim 6 wherein the allyl ester is allyl methacrylate.

8. The process of claim 1 wherein the hydrolysis is conducted with an acid.

9. The process of claim 8 wherein the acid has a $pK_a$ of less than 2.

10. The process of claim 8 wherein the acid is hydrochloric acid.

11. The process of claim 8 wherein the acid is sulfonic acid.

12. The process of claim 8 wherein the acid is methanesulfonic acid.

13. The process of claim 1 wherein the hydrolysis is conducted with a base.

14. The process of claim 13 wherein the base is a quaternary ammonium hydroxide.

15. The process of claim 13 wherein the base is an alkali metal hydroxide or alkoxide.

16. The process of claim 15 wherein the base is sodium methoxide.

17. The process of claim 11 wherein the base is ammonium hydroxide.

* * * * *